United States Patent
Lassanske

[11] Patent Number: 5,881,692
[45] Date of Patent: Mar. 16, 1999

[54] VENTLESS FLUID RESERVOIR

[75] Inventor: George G. Lassanske, Nashotah, Wis.

[73] Assignee: Outboard Marine Corporation, Waukegan, Ill.

[21] Appl. No.: 944,220

[22] Filed: Oct. 6, 1997

Related U.S. Application Data

[63] Continuation of Ser. No. 721,189, Sep. 27, 1996, Pat. No. 5,473,664.

[51] Int. Cl.⁶ ..................................................... B65D 90/04
[52] U.S. Cl. ................................ 123/196 R; 123/196 W; 220/404; 220/564
[58] Field of Search .......................... 123/196 R, 196 W, 123/73 AD; 220/563, 564, 400, 403, 404

[56] References Cited

U.S. PATENT DOCUMENTS

| | | |
|---|---|---|
| 4,008,831 | 2/1977 | Vidilles . |
| 4,026,503 | 5/1977 | Rhodes . |
| 4,903,654 | 2/1990 | Sato et al. . |
| 5,375,703 | 12/1994 | Deuber . |
| 5,505,327 | 4/1996 | Witt . |
| 5,555,997 | 9/1996 | Nogles . |
| 5,673,664 | 10/1997 | Lassanske . |

FOREIGN PATENT DOCUMENTS 6323118  11/1994  Japan .

Primary Examiner—John T Kwon
Attorney, Agent, or Firm—Jones, Day, Reavis & Pogue

[57] ABSTRACT

A fluid reservoir for providing a supply of a lubricating fluid for an internal combustion engine, specifically for use in marine environments. The reservoir includes a housing for containing and protecting, a ventless flexible liner for housing a supply of fluid, where the flexible liner is located within the housing, and an orifice and conduit that extends through the ventless flexible liner and the housing for permitting the introduction of fluid into the ventless flexible liner and for permitting the removal of fluid therefrom. The fluid reservoir is constructed and arranged such that the ventless flexible liner is in a generally collapsed state until a fluid is introduced therein through the orifice. The introduction of fluid into the ventless flexible liner through the orifice expands the ventless flexible liner, while the removal of fluid from the ventless flexible liner collapses the ventless flexible liner proportionally as the fluid is removed and delivered to the engine. The present invention eliminates the need for a vent, thus eliminating the problems associated with the prior art vented fluid reservoirs.

20 Claims, 2 Drawing Sheets

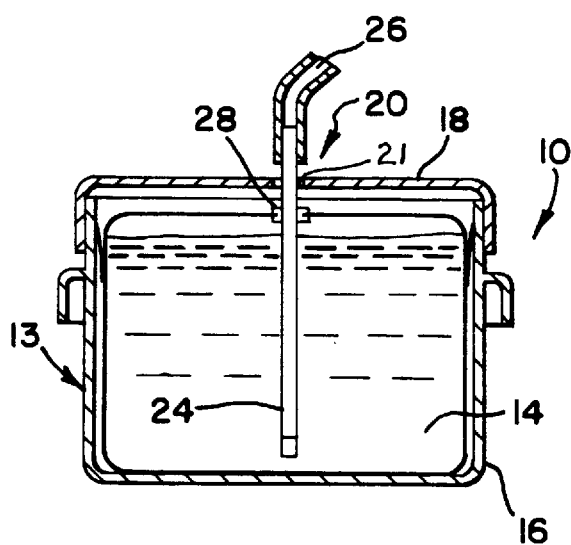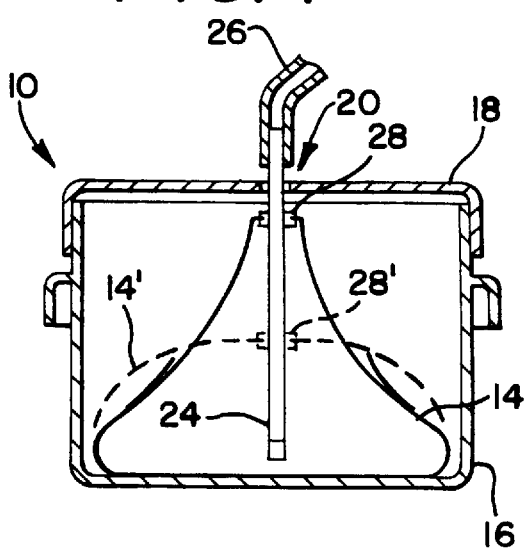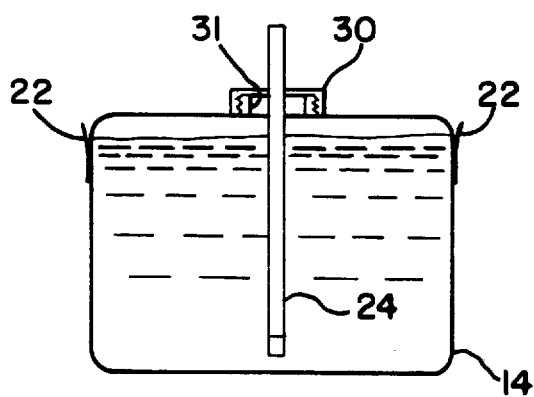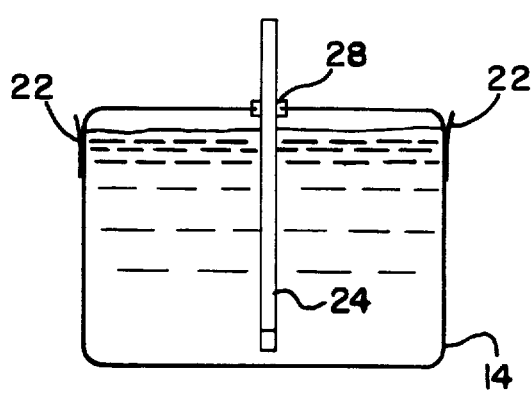

VENTLESS FLUID RESERVOIR

This application is a continuation of Ser. No. 08/721,189, filed Sep. 27, 1996 now U.S. Pat. No. 5,473,664 issued Oct. 7, 1997.

BACKGROUND

The present invention relates generally to a fluid reservoir and more particularly to a ventless fluid reservoir for use with an internal combustion engine in a marine environment. However, it is contemplated as being within the scope of the invention that the disclosed device may be used in other environments, especially those types of environments in which there is a tendency for moisture or debris to be drawn into a conventional vented reservoir.

In the prior art, a known design for oil tanks used with outboard marine motors includes a generally rigid container of plastic or metal construction. In this prior art design, oil is withdrawn from the container by some type of pumping mechanism, which is typically driven by the engine. In order to maintain a constant pressure in the interior of the rigid container as the oil is withdrawn, a vent is normally provided on the container. Thus, as the oil is withdrawn from the container, air is pushed by atmospheric pressure through the vent and into the tank. In a marine environment, the ambient air may also contain significant amounts of moisture that may also be drawn into the container with the air, resulting in contamination of the oil and possible damage to the engine. In addition to the moisture problem, foreign material, such as seaweed, dust, debris or the like, may also be drawn toward the vent. This foreign material may cause problems in either of two ways. First, the foreign material may be drawn into the container through the vent and contaminate the oil and damage the engine. Second, the foreign material may block the vent, resulting in a reduction or elimination of the oil flow to the engine, which may also cause damage to the engine. While some of the problems associated with vents may be partially overcome through the use of screens, filters or other similar types of protective devices, these solutions have not proven entirely effective in eliminating the problems associated with vented fluid reservoirs.

Consequently, a primary object of the present invention is to provide an improved fluid reservoir that will not allow moisture or other foreign matter into the reservoir.

Another object of the present invention is to provide an improved fluid reservoir that does not require a vent, and thus eliminates the problems associated with vented reservoirs.

An additional object of the present invention is to provide an improved ventless fluid reservoir that is unaffected by moisture or foreign matter found in the surrounding environment.

Yet another object of the present invention is to provide an improved ventless fluid reservoir that is suitable for use in a marine environment.

These and other objects of the present invention will be apparent from the following detailed description of the invention, while referring to the attached drawings in which:

FIG. 3 is a cross-sectional schematic representation of the embodiment of the present fluid reservoir assembly shown in FIG. 2 in a filled state;

FIG. 4 is a cross-sectional schematic representation of the embodiment of the present fluid reservoir assembly shown in FIGS. 2 and 3 in a half-filled state;

FIG. 5 is a cross-sectional schematic representation of another embodiment of a ventless flexible liner of the present fluid reservoir assembly; and FIG. 6 is a cross-sectional schematic representation of still another embodiment of a ventless flexible liner of the present fluid reservoir assembly.

The above-listed objects are met or exceeded by the present apparatus that provides an improved ventless fluid reservoir assembly. Generally, the present ventless fluid reservoir assembly includes a flexible liner that collapses upon withdrawal of the fluid located therein. Thus, the pressure inside of the liner is equalized without the need for a vent, thereby eliminating the problems associated with the prior art vented fluid reservoirs.

More specifically, the present fluid reservoir assembly for providing a supply of a fluid to an internal combustion engine includes an outer shell for housing the assembly; a ventless flexible liner, located within the shell, for housing a supply of fluid; and an orifice located in both the liner and the shell for permitting the introduction and removal of a fluid into/from the liner. The present fluid reservoir assembly is constructed and arranged such that the liner is in a generally collapsed state until the fluid is introduced therein through the orifice. The introduction of this fluid into the liner expands the liner, while the removal of this fluid from the liner collapses the liner as the lubricating fluid is removed. With the collapsible structure of the present invention, the need for venting the fluid reservoir is eliminated, thereby preventing the introduction of extraneous moisture or foreign matter into the reservoir.

DETAILED DESCRIPTION OF THE PREFERRED EMBODIMENTS

Figure 1:
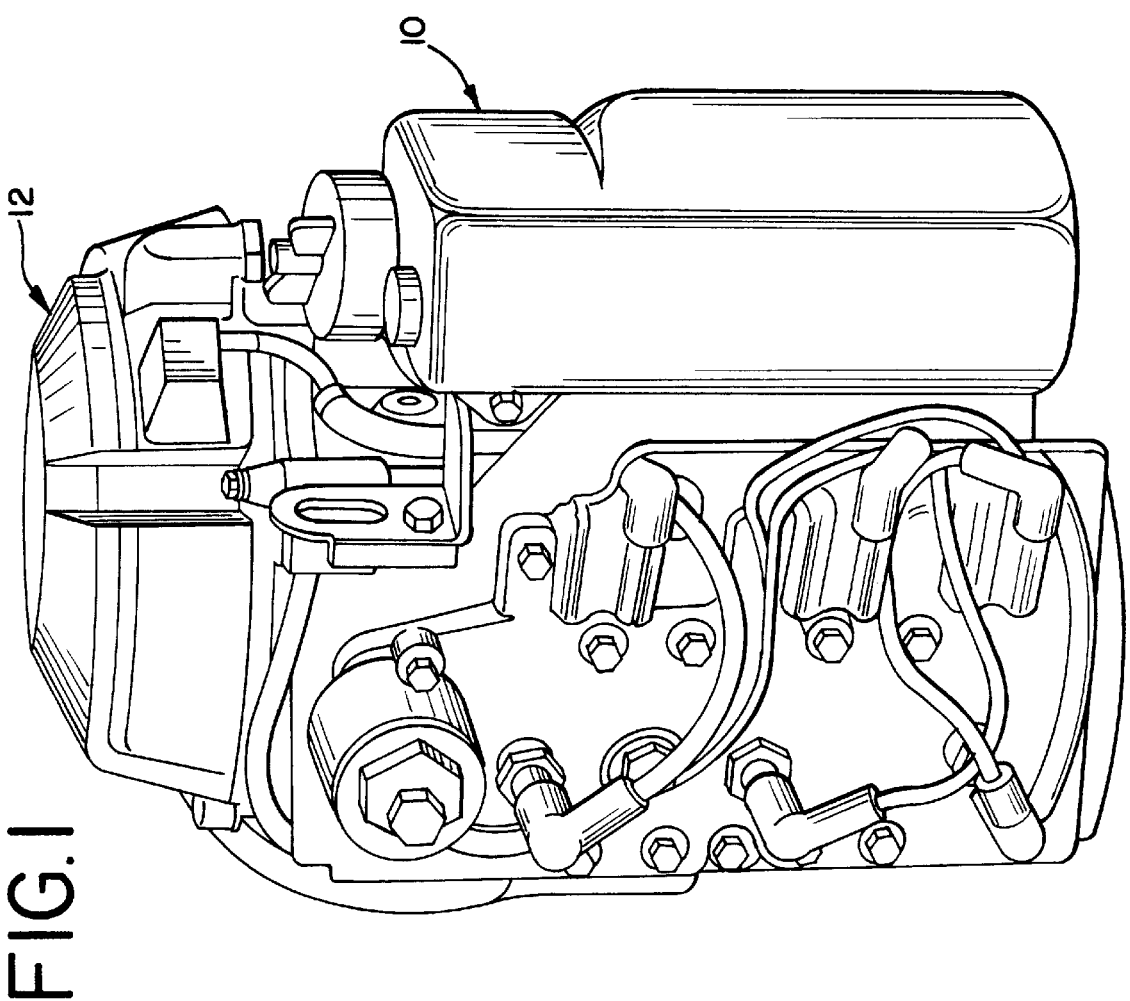
FIG. 1 is a perspective view of an internal combustion engine, for use in a marine environment, including the present fluid reservoir assembly.

Referring now to the drawings, the preferred embodiments of the present fluid reservoir assembly are shown in FIGS. 1 through 6. FIG. 1 shows an embodiment of the fluid reservoir assembly 10 positioned in an internal combustion engine 12 of the type typically used as an outboard engine in marine environments. However, it should be noted that it is contemplated as being within the scope of the invention that the present ventless fluid reservoir assembly may be used with other types of engines or in other types of environments besides a marine environment, especially where there is a danger of contamination to the fluid through an open vent. Additionally, it is also contemplated as being within the scope of the invention that the present ventless fluid reservoir may also be used as an auxiliary fluid reservoir, and thus would not be positioned adjacent an engine, but would instead be located remotely from the engine, and connected to the engine by a number of hoses.

Figure 2:
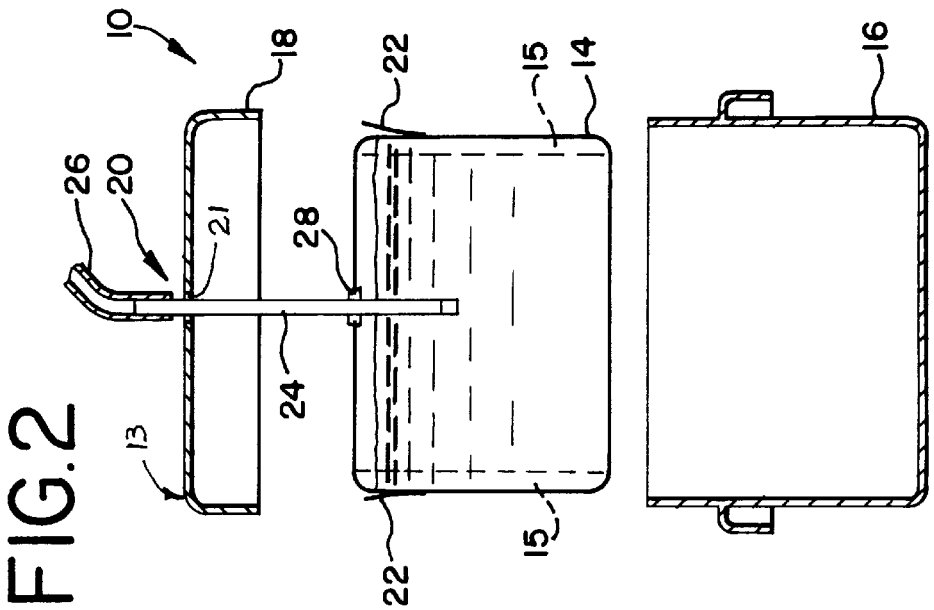
FIG. 2 is an exploded cross-sectional view of a schematic representation of an embodiment of the present fluid reservoir assembly.

Referring now to FIGS. 2, 3, and 4, a schematic representation of an exploded view of an embodiment of the fluid reservoir assembly 10 is shown. This embodiment represents a fluid reservoir assembly of a type that may be used as an auxiliary reservoir. However, the same general elements present in the auxiliary fluid reservoir shown are also present in a fluid reservoir that is to be placed adjacent an engine, aside from any minor design modifications that would be readily apparent to one of ordinary skill in the art (such as alterations in the size or shape of the reservoir, and/or the addition of a simple support structure). Accordingly, while the present description will focus on the auxiliary-type reservoir shown, the description should be considered as applying to other types of reservoirs as well. In general, FIG. 2 shows a ventless flexible container or liner 14, an outer shell or housing 13 including a base portion 16 and a cover portion 18.

The ventless flexible liner 14 is configured so that it can be seated in the base portion 16 of the outer shell, with the cover portion 18 of the outer shell being placed on top of the base portion 16 to form liner protective container (as shown in the protective position in FIGS. 3 and 4). An opening 21 is provided to allow ambient air pressure to act on the liner 14. The flexible liner 14 may include one or more of handles 22 on opposite sides thereof to provide areas to grip the liner 14 to facilitate removal of the liner from the base 16. The liner 14 may be manufactured from any of type of durable, flexible material known to those skilled in the art (such as vinyl, viton, or neoprene) that is flexible enough to easily collapse upon removal of the fluid contained therein and is also resistant to the type of fluid to be contained therein. In certain applications, such as where the liner 14 will be in close proximity with the engine, the material chosen for the liner 14 should also be capable of withstanding the heat generated by the engine. Additionally, the liner 14 may be molded as a single seamless structure, or it may be constructed by affixing a plurality of separate sheets of flexible material together in a fluid tight manner. As an example, two seams 15 are shown in FIG. 2 between the hidden lines and the edges of the flexible liner 14.

The liner 14 and the cover 18 also include an orifice means 20 for permitting the introduction and removal of lubricating fluid. The oriface means includes a conduit 24 extending through the liner 14 and the opening 21 in the cover 18 for transporting the lubricating fluid from the liner 14 to the engine. Attached to the upper portion of the conduit 24 is a hose 26 that extends to connect the conduit 24 to the engine. The conduit 24 should extend downwardly to a point near the bottom of the liner 14 to facilitate removal of the lubricating fluid so that as the level of fluid in the liner 14 decreases, the lower opening of the conduit continues to be immersed in the lubricating fluid. In addition, to maintain the conduit 24 in a fluid tight or sealing arrangement with the liner 14, a seal 28 is provided where the liner 14 and the conduit 24 meet.

The base portion 16 and the cover portion 18 together combine to form the outer shell for the fluid reservoir assembly. The base 16 and the cover 18 may be formed of any rigid material capable of withstanding the environment found in the specific desired application. As known to those skilled in the art, factors to consider when selecting a material for the cover 18 and base 16 include (if relevant for the desired application) the ability of the material to withstand heat from the engine and the ability of the material to resist corrosion from seawater, among other factors. The cover 18 should be configured to be seated upon the base 16 to form on enclosing housing, as shown in FIGS. 1 and 3.

An embodiment of the ventless flexible liner 14 that includes a removable cap 30 is shown in FIG. 5. The removable cap 30 is secured to the conduit 24 is such a manner that the cap 30 and the conduit 24 may be detached from the liner 14 as a unit, and the liner 14 may then be filled, or re-filled, with a fluid after the cap 30 and conduit 24 have been detached. A collar 31 is fluid tightly affixed to the upper portion of the flexible liner 14 to form an opening for the liner 14 to be filled or re-filled. The outer periphery of the collar 31 and the inner periphery of the cap 30 are both threaded so that the cap 30 may be rotated upon the collar 31 to close the opening in the flexible liner 14. Alternatively, the threaded collar 31 may be formed in the cover 18, and the upper portion of the flexible liner 14, which contains the opening, may be formed into a sleeve of a diameter approximately the same size as that of the threaded collar 31. In this manner, the sleeve may be folded over the threaded collar 31, and the opening in the liner may be closed with threaded cap 30. In all other aspects besides those related to the opening in the flexible liner 14, the embodiment in FIG. 5 is substantially the same as the embodiment shown in FIG. 2.

An embodiment of a ventless flexible liner 14 in which the conduit 24 is integrally molded with the liner 14 is shown in FIG. 6. In this embodiment, the seal 28 may also be integrally molded as part of the single unit. One benefit of this embodiment is that due to its relatively simple and inexpensive construction, once the lubricating fluid has been removed from the liner 14, the unit may simply be disposed of and replaced with a new unit. In all other aspects, the embodiment in FIG. 6 is substantially the same as the embodiment shown in FIG. 2.

In operation, the ventless fluid liner 14 is first filled with a lubricating fluid, such as oil, which is introduced into the liner 14 through the conduit 24 until the liner 14 is filled to the desired level, as shown in FIG. 3. Alternatively, in the embodiment shown in FIG. 5, the cap 30 and attached conduit 24 are removed and the liner 14 is filled through the opening in the threaded collar 31. In all embodiments, the liner 14 is in a compressed state prior to the introduction of the fluid into the liner 14. As the liner 14 is filled with fluid, the liner 14 expands to accommodate the volume of fluid introduced. Once the liner 14 is filled to the desired level, the hose 26 is affixed to the conduit 24 in a fluid tight manner so that the fluid inside of the liner 14 may be withdrawn from the liner 14 and conveyed to the engine 12.

The fluid reservoir assembly 10 with the liner 14 in a partially collapsed state is shown in FIG. 4. Upon removal of the fluid, the liner 14 collapses in proportion to the amount of fluid that is withdrawn by the engine 12. When the seal 28 is fixed to the conduit 24, the liner 14 will collapse approximately in the manner shown by the solid lines of liner 14. In the alternative, the seal may also be permitted to slide along the conduit, as indicated by seal 28', which is shown in dashed lines. With the sliding seal 28', the liner will collapse approximately as shown in the dashed lines, indexed as liner 14'. Because (in either embodiment) the volume of the liner 14 is reduced as it collapses in proportion to the amount of fluid removed therefrom, the pressure inside of the liner is automatically equalized, and there is no need to include a vent in the liner for this purpose. Accordingly, because the present invention eliminates the need for the vent of the prior art, the problems associated with a vent (such as blockage of the vent or admission of moisture into the reservoir) are also eliminated.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A fluid reservoir for providing a supply of a fluid comprising:

a housing;

a ventless flexible liner for containing a supply of fluid, said flexible liner being located within said housing; and orifice means in said ventless flexible liner and extending through said housing for permitting the introduction of fluid into said ventless flexible liner and for permitting the removal of fluid therefrom;

said fluid reservoir being constructed and arranged such that said ventless flexible liner is in a generally collapsed state until fluid is introduced therein through said orifice means, the introduction of fluid to said ventless flexible liner through said orifice means expanding said ventless flexible liner, and the removal of fluid from said ventless flexible liner through said orifice means collapsing said ventless flexible liner as fluid is removed.

2. The fluid reservoir as defined in claim 1 wherein said orifice means comprises the only path of fluid communication between an interior and an exterior of said ventless flexible liner.

3. The fluid reservoir as defined in claim 2 further comprising;

a conduit for transporting said fluid between said ventless flexible liner and another object, said conduit being positioned within said orifice means in a fluid tight manner.

4. The fluid reservoir as defined in claim 3 wherein said conduit is integrally molded into said ventless flexible liner.

5. The fluid reservoir assembly as defined in claim 1 wherein said housing is comprised of:

a base portion shaped generally as an open container within which said ventless flexible liner is positioned; and a cover portion configured and arranged for placement upon said base portion.

6. The fluid reservoir as defined in claim 1 wherein said fluid is an oil.

7. The fluid reservoir as defined in claim 3 wherein said object is an internal combustion engine.

8. The fluid reservoir as defined in claim 1 wherein said ventless flexible liner is of unitary construction.

9. The fluid reservoir as defined in claim 1 wherein said ventless flexible liner is formed from a plurality of sheets which are affixed to each other in a fluid tight manner.

10. The fluid reservoir as defined in claim 5 wherein said ventless flexible liner includes handle means to facilitate removal of said ventless flexible liner from said base portion of said outer shell.

11. A ventless fluid reservoir assembly for a marine internal combustion engine comprising:

a housing;

a flexible liner located within said housing for containing a supply of fluid; and orifice means in said flexible liner and said housing for permitting the introduction of fluid into said flexible liner and for permitting the removal of fluid therefrom, said orifice means being the only path of fluid communication between an interior and an exterior of said flexible liner;

wherein removal of fluid from said flexible liner through said orifice means collapses said flexible liner in response to the volume of fluid removed, said collapsing of said flexible liner eliminates the need for venting said flexible and thereby preventing the introduction of extraneous moisture into said flexible liner.

12. The fluid reservoir assembly as defined in claim 11 further comprising a conduit for transporting said fluid between said flexible liner and said marine internal combustion engine, said conduit being positioned within said flexible liner in a fluid tight manner.

13. The fluid reservoir assembly as defined in claim 12 wherein said conduit is integrally molded into said flexible liner.

14. The fluid reservoir assembly as defined in claim 11 wherein said housing is comprised of:

a base portion shaped generally as an open container within which said flexible liner is positioned; and a cover portion configured and arranged for placement upon said base portion.

15. The fluid reservoir assembly as defined in claim 11 wherein said flexible liner is of unitary construction.

16. The fluid reservoir assembly as defined in claim 11 wherein said ventless flexible liner is formed from a plurality of sheets which are affixed to each other in a fluid tight manner.

17. The fluid reservoir assembly as defined in claim 5 wherein said flexible liner includes handle means to facilitate removal of said flexible liner from said base portion of said housing.

18. A ventless fluid reservoir for use with a fluid using object such as an internal combustion engine comprising:

a flexible liner for containing a supply of fluid; and a conduit in fluid tight connection to said flexible liner and disposed in said flexible liner and extending outside of said flexible liner for permitting the introduction of fluid to said flexible liner and for permitting the removal of fluid therefrom, said conduit being the only path of fluid communication between an exterior and an interior of said flexible liner;

wherein removal of fluid from said flexible liner through said conduit collapses said flexible liner in response to the volume of fluid removed, said collapsing of said flexible liner eliminates the need for venting of said flexible liner and thereby preventing the introduction of extraneous matter into said flexible liner.

19. A ventless fluid reservoir as claimed in claim 18 wherein:

said conduit is integrally molded with said flexible liner.

20. The ventless fluid reservoir as claimed in claim 18 wherein:

said fluid is a lubricating oil.

* * * * *